United States Patent [19]

Shirley

[11] Patent Number: 5,072,915
[45] Date of Patent: Dec. 17, 1991

[54] ELECTRIC LIVESTOCK GUARD

[76] Inventor: Murphy Shirley, Rte. 1, Box 116, Bear Creek, Ala. 35543

[21] Appl. No.: 522,561

[22] Filed: May 14, 1990

[51] Int. Cl.⁵ .............................................. A01K 3/00
[52] U.S. Cl. ........................................ 256/14; 256/10; 256/24; 49/57
[58] Field of Search ...................... 256/10, 14, 17, 24; 49/55, 58, 49, 59; 404/6

[56] References Cited

U.S. PATENT DOCUMENTS

| | | | |
|---|---|---|---|
| 2,512,740 | 6/1950 | Evans | 256/10 |
| 2,555,180 | 5/1951 | Adkins | 256/10 |
| 2,633,337 | 3/1953 | Nieuwenhuis | 256/10 |
| 2,769,617 | 11/1956 | Hutchinson | 256/10 |
| 2,800,304 | 7/1957 | Van Alsburg | 256/14 |
| 2,899,174 | 8/1959 | Wells | 256/10 |
| 3,491,480 | 1/1970 | Nickel et al. | 49/59 |
| 3,756,566 | 9/1973 | Bangs | 256/10 |
| 3,933,311 | 1/1976 | Lemelson | 256/24 X |

FOREIGN PATENT DOCUMENTS

| | | | |
|---|---|---|---|
| 2133506 | 1/1973 | Fed. Rep. of Germany | 256/10 |
| 3914894 | 10/1989 | Fed. Rep. of Germany | 256/10 |
| 7313921 | 4/1974 | Netherlands | 256/19 |
| 7710230 | 3/1979 | Netherlands | 256/10 |

Primary Examiner—Andrew V. Kundrat
Assistant Examiner—Franco S. DeLiguori
Attorney, Agent, or Firm—Dowell & Dowell

[57] ABSTRACT

An electric livestock guard or gate for prohibiting the passage of livestock through a roadway opening in a fenced enclosure and which includes a base portion of interlocking segments over which a metallic grid is suspended by springs which mount each end of the grid to spaced insulators carried by the base portion.

8 Claims, 2 Drawing Sheets

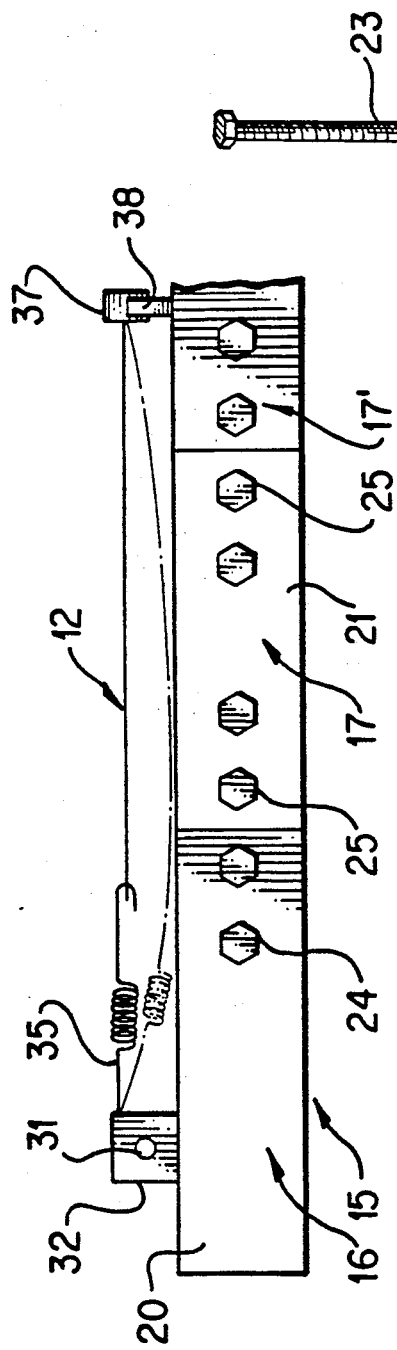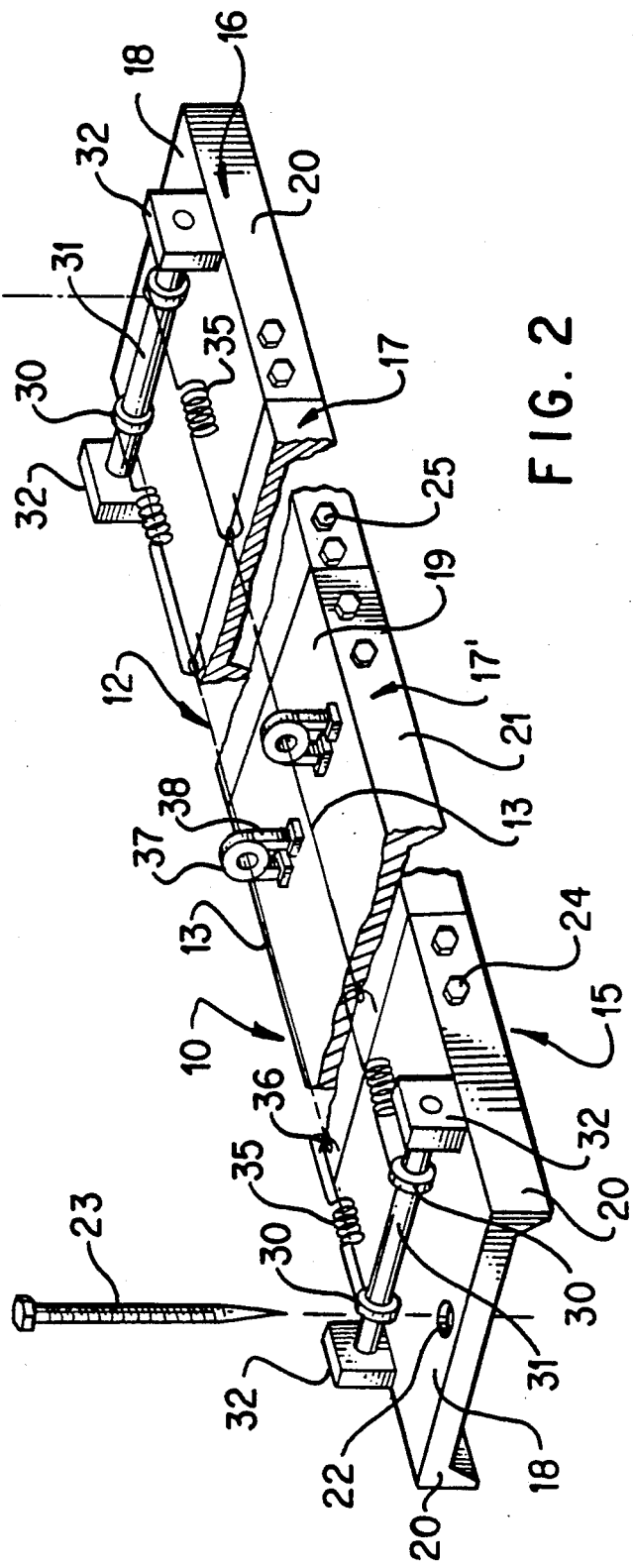

ELECTRIC LIVESTOCK GUARD

BACKGROUND OF THE INVENTION

1. Field of the Invention

This invention is generally directed to cattle or livestock guards or gates of the type which are designed to permit vehicular traffic to pass thereover when traveling into or out of an enclosed area while simultaneously prohibiting livestock from passing therethrough. More particularly, however, the invention is directed to an electrical livestock guard which includes a selectively electrified wire mesh or steel wire rope grid which is retained in a taut generally horizontal orientation in vertically spaced relationship to a metallic base by springs or other resilient connections which mount the grid to insulators mounted to the base. In this manner, the grid is elevated to prohibit livestock passing with respect thereto but is vertically yieldable so as to allow vehicles to pass there over. Also, the base of the electrical livestock guard or gate includes a plurality of end and intermediate segments which can be selectively joined in generally coextensive relationship with respect to one another thereby allowing the base to be adjusted in length to suit varying widths of passageways or openings through a fence.

2. History of the Related Art

The use of cattle or livestock guards in farm or ranch areas to replace gates and fences at locations where vehicular access is necessary is well known. Such guards are specifically designed to do away with the inconvenience of having to physically open and close gates and also prevent livestock from escaping from a fenced enclosure in those instances where, through accident or inadvertance, a gate is not properly or adequately closed and/or locked. Some of the original cattle guards were created due to the necessity for railroads to extend through grazing ranges and yet restrict the movement of cattle within such areas.

Early cattle guards were specifically constructed to prevent hooved animals from being able to obtain sure footing by using spaced and elevated rails or poles which had generally tapered or circular cross sections. The problem associated with such structures however, is that they required a large number of heavy duty and hard to manipulate and assemble components. Such guards could not be effectively preformed in one location for later installation in another location. Also, once installed, such large and complex structures could not be easily altered in the event an increased width of access became necessary through a fence.

In an effort to overcome the disadvantages of permanently installed type cattle guards, an effort was made to provide guards which could be more portable in nature. In U.S. Pat. No. 2,800,304 to Van Alsburg, a portable cattle guard is disclosed which includes a metallic frame from which a plurality of bars are horizontally extended so as to be in space relationship to the base or frame. The rods extending across the guard are resiliently urged so that the bars could be collapsed vertically with respect to the base in order to permit vehicular traffic to pass through the opening in which the guard was installed. Unfortunately, such portable cattle guards require a large number of components which may easily become damaged due to the passage of vehicles over the structure during use. Once a particular element of the cattle guard is damaged, it is necessary to replace the element in order to maintain the effectiveness of the cattle guard. Even with these drawbacks, the overall weight of such portable guards requires a great deal of physical effort to be exerted to install the units in a given area. Further, such portable guards are not conducive to being adjusted for varying widths of passageways or openings in fenced areas and therefore specific frames must be constructed for each location.

In order to increase the effectiveness of the cattle guards such as disclosed in the patent to Van Alsburg, cattle guards were provided with metallic conductors so that electricity could be supplied to the conductors which were often in the form of elongated rods. Such conductors could thereafter be electrically connected to the conductors associated with an electrified fence. An example of this type of cattle guard is disclosed in U.S. Pat. No. 2,899,174 to Wells. However, such structures are bulky and cumbersome and not adjustable to openings or passageways through fenced areas. Further, the elements utilized for conducting electricity which form the basis of the cattle guards could easily be damaged by the passage of vehicular traffic and therefore would require frequent replacement to maintain the efficiency of the guards.

Another type of electric livestock guard or gate is disclosed in U.S. Pat. No. 2,769,617 to Hutchinson. In this structure, the rigid metallic conducting bars associated with other livestock guards were replaced by chain elements which could be retained taut by the use of springs connected to a frame to which the chain elements were mounted. With this structure, damage to the conductors associated with the livestock guard was reduced. Unfortunately, the frames were not conducive to being adjusted in size so as to permit the guards to be utilized with various openings in fenced areas. In addition, each of the chain elements would have to be individually mounted with respect to the frames thereby necessitating an increased cost for the overall livestock guard and also requiring increased maintenance to insure that each of the conductor elements was properly mounted and remained effective. The failure of one or more such flexible conductors could result in livestock being able to cross the guard without receiving an electrical impulse as is necessary to discourage their passage.

A similar type of electric cattle guard is disclosed in U.S. Pat. No. 2,512,740 to Evans. In this structure, either a single or multiple electrical conductors are provided between vertically embedded posts with the conductors resiliently urged relative to the posts to maintain tension on the conductors. Unfortunately, with this type of structure, it is necessary that the supports be embedded in the ground thus requiring an increase in manual labor to install the cattle guard in a given crossing.

SUMMARY OF THE INVENTION

This invention is directed to an electrical cattle guard or livestock gate which includes a flexible electrifiable grid which is mounted in generally horizontal orientation and vertically spaced relationship with respect to a metallic base which may be selectively adjusted in size using a plurality of intermediate base segments or sections which are selectively joined to one another. The electrifiable grid is retained taut by resilient elements such as springs which are mounted to the base by insulators. The resilient mounting allows the electrifiable grid to be vertically deflected in order to permit the passage of vehicular traffic. The grid may be electrically connected to an adjacent electrified fence or may be separately energized by a suitable low voltage power source.

It is the primary object of the present invention to provide an electrical livestock guard or gate wherein a flexible electrifiable grid is resiliently mounted so that the grid is normally elevated to prevent livestock from passing therethrough but which is yieldable to permit vehicular traffic to pass therethrough and which is portable and easily assemblable while being easily adjustable for selective installation across crossings of various dimensions.

It is yet a further object of the present invention to provide a livestock guard which utilizes a flexible electrically charged wire mesh or steel wire rope grid as an electrical conductor which grid may be selectively mounted to a metallic base through the use of a plurality of spaced insulators so that the grid is normally retained free from engagement with the metallic base element.

BRIEF DESCRIPTION OF THE DRAWINGS

FIG. 2 is a perspective view of the livestock guard of the present invention;

FIG. 4 is an illustrational view showing the electrifiable wire grid in its normal raised and deflected positions.

DESCRIPTION OF THE PREFERRED EMBODIMENT

Figure 1:
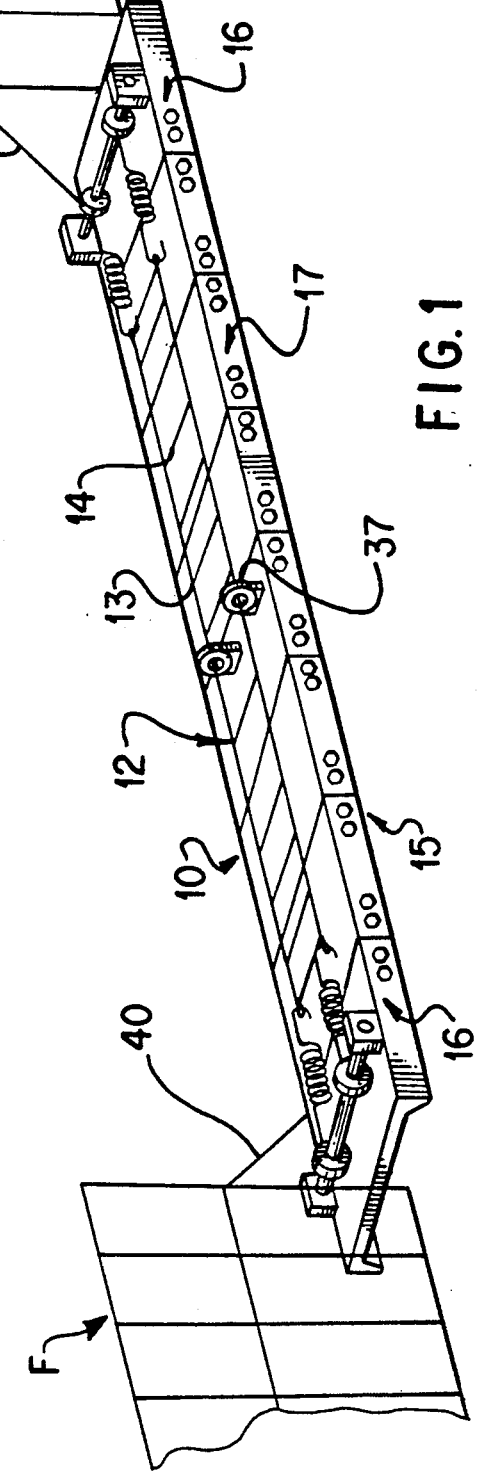
FIG. 1 is an illustrational view of the livestock guard of the present invention as installed across a roadway or opening in an electrical fence.

With continued reference to FIG. 1 of the drawings, the electrical livestock guard 10 of the present invention is shown as being installed across a roadway in an electrified fence F. The guard includes an electrifiable grid 12 of wire mesh or steel wire rope having at least two spaced longitudinal wires or ropes 13 which are electrically connected by a plurality of spaced traverse wires or ropes 14. The grid 12 is mounted above a metallic base 15 which includes a pair of end segments 16 to which one or more intermediate segments 17 are mounted.

Each of the end and intermediate segments 16 and 17 are plates having U-shaped crosssections including upper surfaces 18 and 19 and depending side flanges 20 and 21, respectively. The flanges 20 and 21 are preferably tapered away from the upper surfaces 18 and 19 so as to form elongated wedges which penetrate into the earth's surface when the base is installed and thereby assist in anchoring the base. The end segments include an opening 22 adjacent the outer ends thereof through which elongated earth engaging anchor screws 23 are selectively inserted so as to secure the end segments to the ground and prevent any shifting of the base relative to its longitudinal axis. The end segments are provided with a pair of spaced openings in each side flange 20 adjacent the inner ends thereof through which locking bolts 24 are selectively received.

Figure 3:
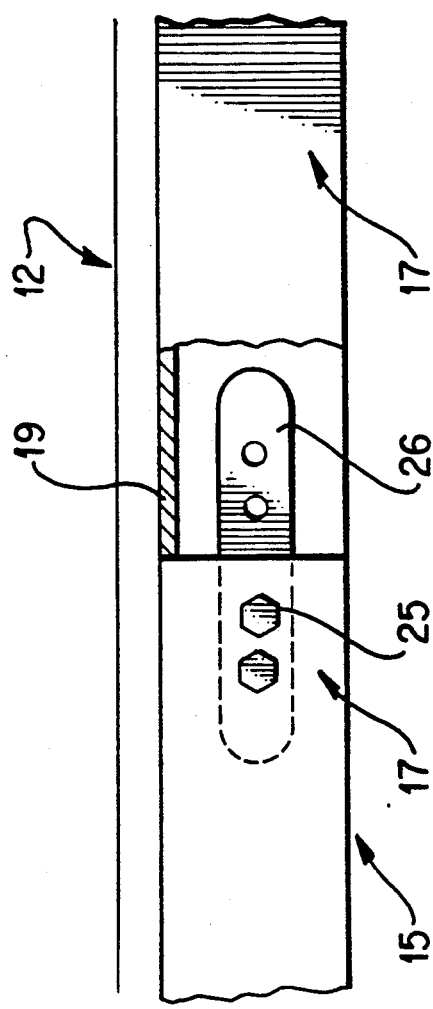
FIG. 3 is a partial view having portions broken away showing the connectors for joining the base segments of the present invention.

Each of the intermediate segments 17 are also provided with pairs of spaced openings in each of the flanges 21 adjacent each end of the segments through which locking bolts 25 are selectively received. The base segments are secured to one another by pairs of connector links 26 (FIG. 3) which are aligned with the openings in the side flanges of the segments. Suitable locking nuts (not shown) may be used to secure each of the locking bolts 24 and 25 in position. With present invention, the number of intermediate base segments may be selectively chosen so that the base will conform to any size width of opening in the fence F.

To retain the electrifiable grid 12 in vertical relationship with respect to the base 15, a pair of insulators 30 are mounted to crossbars 31 attached to space brackets 32 which are welded or otherwise secured to the upper surface of each base end segment. Springs 35 have one end mounted to the insulators 30 and their other end extending through eyelets 36 provided in the ends of the longitudinal wires or ropes 13. The springs 35 are chosen so as to apply sufficient tension on the grid 12 to maintain the grid taut and horizontally oriented with respect to the base 15. The springs, however, will stretch and permit the grid to flex towards the base when vehicular traffic engages the grid. Although the springs 35 are shown as being provided at each end of the grid, in some instances, it may be possible to use the springs at only one end.

To provide further insulated support for the grid 15, and especially when the base includes a plurality of intermediate segments 16, the center base segment 16' is provided with a pair of spaced generally circular insulators 37 which are mounted to brackets 38 which are bolted or otherwise secured to the upper surface of the base segment. The intermediate insulators 37 insure that the electrifiable grid will not sag and will be retained generally parallel to the base.

In use, the width of an entrance or opening in a fence is first determined and then the number of intermediate base segments 13 selected to provide a base which will adequately span the opening. It is preferred that the base segments be constructed in standard lengths of between 1 to 6 feet in order to make manual handling of the segments possible. The locking bolts 24 and 25 are thereafter used to assemble the ends and intermediate segments 15 and 16 of the base.

Once the base is assembled, the base is anchored to the ground utilizing the anchoring screws 23. The wire mesh or steel wire rope grid is then cut to an appropriate length and the eyelets connected to the ends thereof. The springs 35 are thereafter secured to the insulators and to the grid thereby drawing the grid taut and in spaced relationship to the base. Electrical conductors, such as conductors 40 and 41, are then electrically connected to a connecting wire of an adjacent fence and to one of the metallic spring elements 35 or longitudinal wires or ropes 13 so that the grid is electrified as power is applied from the fence. As an alternative, a separate, low power source of electricity may be mounted adjacent to the livestock guard and connected directly to either the springs or the longitudinal wires or ropes to directly electrify the grid without requiring a connection to the adjacent fence.

I claim:

1. An electric livestock guard which is mounted in an access passageway in a fence, said guard comprising, a base having spaced end portions and at least one intermediate segment, said end portions and said intermediate segment of said base being formed in a low profile of a material over which vehicle traffic may pass and having generally planar upper surfaces, anchor means for securing said base to the ground, at least one insulator means mounted to each of said end portions of said base, means for mounting said insulator means to said end portions of said base, electrifiable grid means, said grid means having opposite ends, first connector means for connecting one of said ends of said grid means to one of said insulator means and second connector means for connecting the other of said ends of said grid means to the other of said insulator means, and at least said first connector means being resilient to thereby place tension on said grid means to maintain said grid means taut and in vertical relationship with respect to said base, means for electrifying said grid means, and means for joining said intermediate segment to said end portions so that said upper surface thereof is in generally coextensive relationship with respect to said upper surfaces of said end portions of said base.

2. The electric livestock guard of claim 1 in which said second connector means is resilient.

3. The electric livestock guard of claim 1 including at least one intermediate insulator means, and mounting means for mounting said intermediate insulator means in spaced vertical relationship with respect to said intermediate segment of said base.

4. The electric livestock guard of claim 3 in which said grid means includes at least two elongated conductors which are electrically connected by at least two intermediate transversely extending conductor segments, and a pair of intermediate insulator means, one of said elongated wires of said grid means extending through a separate one of said intermediate insulator means.

5. The electric livestock guard of claim 3 in which said grid means is a wire mesh.

6. The electric livestock guard of claim 1, in which each of said end portions and intermediate segment of said base include spaced side flanges which extend downwardly from said upper surfaces thereof, each of said end portions and said intermediate segment having generally inverted U-shaped cross sections, said side flanges being tapered inwardly to an outermost edge which is spaced from said upper surfaces.

7. The electric livestock guard of claim 6 in which said means for joining said intermediate segment to said end portions includes links secured to said side flanges of said intermediate segment and said end portions of said base.

8. The electric livestock guard of claim 7 including a plurality of intermediate segments.

* * * * *